United States Patent
Inoue et al.

(10) Patent No.: US 7,882,310 B2
(45) Date of Patent: *Feb. 1, 2011

(54) METHODS AND APPARATUS FOR MANAGING A SHARED MEMORY IN A MULTI-PROCESSOR SYSTEM

(75) Inventors: Keisuke Inoue, Kanagawa (JP); Masahiro Yasue, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 457 days.

This patent is subject to a terminal disclaimer.

(21) Appl. No.: 12/113,366

(22) Filed: May 1, 2008

(65) Prior Publication Data
US 2008/0209156 A1    Aug. 28, 2008

Related U.S. Application Data

(63) Continuation of application No. 11/031,461, filed on Jan. 7, 2005, now Pat. No. 7,386,687.

(51) Int. Cl.
*G06F 12/00* (2006.01)
(52) U.S. Cl. .................. 711/147; 711/156; 711/221
(58) Field of Classification Search .................. 711/147, 711/152, 156, 221
See application file for complete search history.

(56) References Cited

U.S. PATENT DOCUMENTS

| 6,185,654 | B1 * | 2/2001 | Van Doren ............... 711/5 |
| 6,526,491 | B2 | 2/2003 | Suzuoki et al. |
| 6,628,668 | B1 | 9/2003 | Hutzli et al. |
| 6,874,074 | B1 | 3/2005 | Burton et al. |
| 2002/0059503 | A1 * | 5/2002 | Dennie ................. 711/153 |

* cited by examiner

*Primary Examiner*—Stephen C Elmore
(74) *Attorney, Agent, or Firm*—Matthew B. Dernier, Esq.; Gibson & Dernier LLP

(57) ABSTRACT

Methods and apparatus provide for associating memory allocation table (MAT) entries with nodes in a binary tree such that the nodes and the entries are grouped into hierarchical levels, each entry including status information; associating the nodes and the entries with segments of a shared memory of a multi-processor system such that higher level nodes and entries are associated with larger numbers of segments of the shared memory and lower level nodes and entries are associated with smaller numbers of segments of the shared memory; initializing the MAT such that the status information of at least a plurality of entries indicates that the associated segment or segments of the shared memory are available for reservation; and selecting one entry in a group of entries in the MAT at a level corresponding to a desired size of the shared memory to be reserved.

25 Claims, 12 Drawing Sheets

FIG. 3

MEMORY ALLOCATION TABLE (initialized) 110

| 1 | 2 | 3 | 4 | 5 | 6 | 7 | 8 | 9 | 10 | 11 | 12 | 13 | 14 | 15 |
|---|---|---|---|---|---|---|---|---|----|----|----|----|----|----|
| I | I | I | I | I | I | I | I | I | I  | I  | I  | I  | I  | I  |

FIG. 4

| 00 | I |
|----|---|
| 01 | N |
| 10 | U |
| 11 | C |

FIG. 7

MEMORY ALLOCATION TABLE (state A) — 110

| 1 | 2 | 3 | 4 | 5 | 6 | 7 | 8 | 9 | 10 | 11 | 12 | 13 | 14 | 15 |
|---|---|---|---|---|---|---|---|---|----|----|----|----|----|----|
| N | N | I | N | I | I | I | U | I | I  | I  | I  | I  | I  | I  |

FIG. 8

MEMORY ALLOCATION TABLE (state B) — 110

| 1 | 2 | 3 | 4 | 5 | 6 | 7 | 8 | 9 | 10 | 11 | 12 | 13 | 14 | 15 |
|---|---|---|---|---|---|---|---|---|----|----|----|----|----|----|
| N | N | I | N | I | I | I | U | U | I  | I  | I  | I  | I  | I  |

FIG. 9

MEMORY ALLOCATION TABLE (state C) — 110

| 1 | 2 | 3 | 4 | 5 | 6 | 7 | 8 | 9 | 10 | 11 | 12 | 13 | 14 | 15 |
|---|---|---|---|---|---|---|---|---|----|----|----|----|----|----|
| N | N | I | N | U | I | I | U | U | I  | I  | I  | I  | I  | I  |

MEMORY ALLOCATION TABLE (state D)

MEMORY ALLOCATION TABLE (state E)

MEMORY ALLOCATION TABLE (state F)

FIG. 13

KEY TABLE
112

| OBJECT NAME | NODE NAMES |
|---|---|
| OBJECT 0 | 8 |
| OBJECT 1 | 9 |
| OBJECT 2 | 5 |
| OBJECT 3 | 12 |
| OBJECT 4 | 13 |
| OBJECT 5 | NOT RESERVED |

METHODS AND APPARATUS FOR MANAGING A SHARED MEMORY IN A MULTI-PROCESSOR SYSTEM

CROSS REFERENCE TO RELATED APPLICATIONS

This application is a continuation of U.S. patent application Ser. No. 11/031,461, now U.S. Pat. No. 7,386,687, filed Jan. 7, 2005, the entire disclosure of which is hereby incorporated by reference.

BACKGROUND

The present invention relates to methods and apparatus for managing a shared memory in a multi-processor system in which portions of the memory may be reserved.

In recent years, there has been an insatiable desire for faster computer processing data throughputs because cutting-edge computer applications involve real-time, multimedia functionality. Graphics applications are among those that place the highest demands on a processing system because they require such vast numbers of data accesses, data computations, and data manipulations in relatively short periods of time to achieve desirable visual results. These applications require extremely fast processing speeds, such as many thousands of megabits of data per second. While some processing systems employ a single processor to achieve fast processing speeds, others are implemented utilizing multi-processor architectures. In multi-processor systems, a plurality of sub-processors can operate in parallel (or at least in concert) to achieve desired processing results.

In some existing multi-processor systems a plurality of parallel processors may use a shared memory in to store data. Memory management techniques are employed to prevent allocation of areas that are already being used and to permit allocation of unused areas. The conventional approach to manage the allocation of the shared memory involves a managing processor as an arbiter of the memory areas. This approach removes autonomy from the parallel processors and, therefore, decreases processing efficiency in some instances.

SUMMARY OF THE INVENTION

One or more embodiments of the present invention may provide for the parallel processors of a multi-processor system to control memory allocation by accessing a memory allocation table (MAT) from a shared memory of the system. The processors are further operable to search the table for unused segments of memory, and reserve one or more segments as needed. The invention also provides for an extremely compact MAT structure that can be copied from the shared memory in one DMA cycle, easily searched and easily updated.

The MAT is preferably a one dimensional array, where each sequential location in the array corresponds with a "node" and the contents of each location includes status bits (preferably 2 bits). The nodes of the MAT represent the nodes of a binary tree. The root node, node 1, is at level 0 (at the top of the tree) and represents the maximum allocation space of the shared memory. Intermediate nodes 2 and 3, which depend from node 1, are at level 1 and each represent ½ of the maximum allocation space. Intermediate nodes 4 and 5, which depend from node 2, and intermediate nodes 6 and 7, which depend from node 3, are at level 2 and each represent ¼ of the maximum allocation space. Assuming a four level tree (L=4), terminal nodes 8 and 9 (depending from node 4), terminal nodes 10 and 11 (depending from node 5), terminal nodes 12 and 13 (depending from node 6), and terminal nodes 14 and 15 (depending from node 7) are at level 3 and each represent ⅛ of the maximum allocation space.

The contents of each node location of the MAT preferably include two status bits, which may represent: N=partial reservation; I=available; U=used; and C=continued.

In keeping with the example above and assuming, for example, a maximum allocation size of 8 KB, each terminal node (i.e., nodes 8-15) represent a 1 KB segment of memory that may be allocated, which is also the granularity of the allocation. The size of the MAT is equal to the number of nodes ($2^L - 1$) times 2 bits, which in this case is 15*2=30 bits.

A processor seeking to obtain space (e.g., 1 KB of space) in the shared memory reads the MAT from shared memory (advantageously using a single DMA transfer). The processor converts the size of the space needed to a level in the tree using the following equation: level=$\log_2$ (Max space/requested space), which in the example above is level=$\log_2$ (8 KB/1 KB)=3. This level corresponds to the terminal nodes 8-15 in the MAT. Starting at node 8, the processor searches for a status of (I), such as may be found, for example, at node 10. Next, the lineage of node 10 is tested to see if a larger area of the memory (e.g., two or more contiguous segments) were previously reserved. If not, then the segment of the shared memory associated with node 10 and entry 10 of the MAT may be reserved.

In accordance with one or more further aspects of the present invention, methods and apparatus provide for: associating memory allocation table (MAT) entries with nodes in a binary tree such that the nodes and the entries are grouped into hierarchical levels; associating the nodes and the entries with segments of a shared memory of a multi-processor system such that higher level nodes and entries are associated with larger numbers of segments of the shared memory and lower level nodes and entries are associated with smaller numbers of segments of the shared memory; and selecting one or more segments of the shared memory by evaluating status information of entries of the MAT corresponding to a desired size of the shared memory to be reserved followed by evaluating status information of one or more higher level entries.

The status information of each entry includes at least: (i) an indicator of whether the associated segment or segments of the shared memory have been reserved or are available for reservation; and (ii) an indicator that the segment or segments of the shared memory associated with one or more lower level entries in a lineage of the given entry have been reserved.

A highest level node in the tree and an associated highest level entry in the MAT are preferably associated with all of the segments of the shared memory; and a plurality of lowest level nodes in the tree and an associated plurality of lowest level entries in the MAT are preferably each associated with one segment of the shared memory.

The MAT is preferably initialized such that the status information of at least a plurality of entries indicates that the associated segment or segments of the shared memory are available for reservation.

The function of selecting one or more segments of the shared memory may include computing a level in the MAT based on a desired size of the shared memory to be reserved. The level in the MAT may be computed to be approximately equal to $\log_2 (M/D)$, where M is the maximum size of the shared memory available for reservation and D is the desired size of the shared memory to be reserved.

The methods and apparatus preferably further provide for selecting one of the entries associated with the computed level having status information indicating that the associated segment or segments of the shared memory are available for reservation. The methods and apparatus may further provide for evaluating one or more higher level entries in a lineage of the selected entry to determine whether the higher level entries have status information indicating that the associated segments of the shared memory are available for reservation. This function is preferably repeated for successively higher level entries in the lineage until status information of one of the higher level entries indicates that the associated segments of the shared memory are available for reservation.

A different one of the entries associated with the computed level may be selected when the determination indicates that one or more of the higher level entries in the lineage have status information indicating that the associated segments of the shared memory are not available for reservation.

The evaluation may include: continuing the evaluation of a sequentially higher level entry in the lineage when the status information of a current entry indicates that all segment(s) of the shared memory associated with the current entry are available for reservation. This evaluation is preferably repeated until the status information of the current entry indicates that a prior reservation was made for one or more memory segments associated with a lower level entry in the MAT but not all the memory segments associated with the current entry were reserved, whereby the evaluation of higher level entries in the lineage is terminated.

The status information of all the evaluated entries is preferably modified when: (i) the status information of all the evaluated entries indicate that all segment(s) of the shared memory associated with the respective evaluated entries are available for reservation, and (ii) the highest level entry in the MAT is reached prior to terminating the sequential evaluation. For example, the status information for each evaluated entry is modified to indicate that a prior reservation was made for one or more memory segments associated with a lower level entry in the MAT but not all the memory segments associated with the current entry were reserved.

The provisionally selected entry of the MAT may be abandoned when the evaluation of the status information of a current higher level entry in the lineage indicates that all segment(s) of the shared memory associated with the current entry are reserved. In this situation, another entry of the group of entries may be provisionally selected at the computed level having status information indicating that the one or more segments of the shared memory associated with the provisionally selected entry are available for reservation. Thereafter, the evaluation may be performed on one or more higher level entries in a lineage of the other provisionally selected entry to determine whether the status information indicates that the one or more segments of the shared memory associated with the other provisionally selected entry are available for reservation.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

FIG. 3 is a conceptual illustration of certain aspects of a memory allocation table of the system of FIG. 1 in accordance with one or more aspects of the present invention;

FIG. 4 is a truth table illustrating a relationship between status states of the memory allocation table and binary representations thereof;

FIGS. 7-12 are conceptual illustrations of the memory allocation table of the system of FIG. 1 as segments of a shared memory of the system are reserved in accordance with one or more aspects of the present invention;

FIG. 13 is a block diagram illustrating the structure of a key table that may be implemented in the multi-processing system of FIG. 1 (or other embodiments) in order to share reserved objects among the processors of the system in accordance with one or more further aspects of the present invention;

DETAILED DESCRIPTION OF THE PRESENT INVENTION

Figure 1:
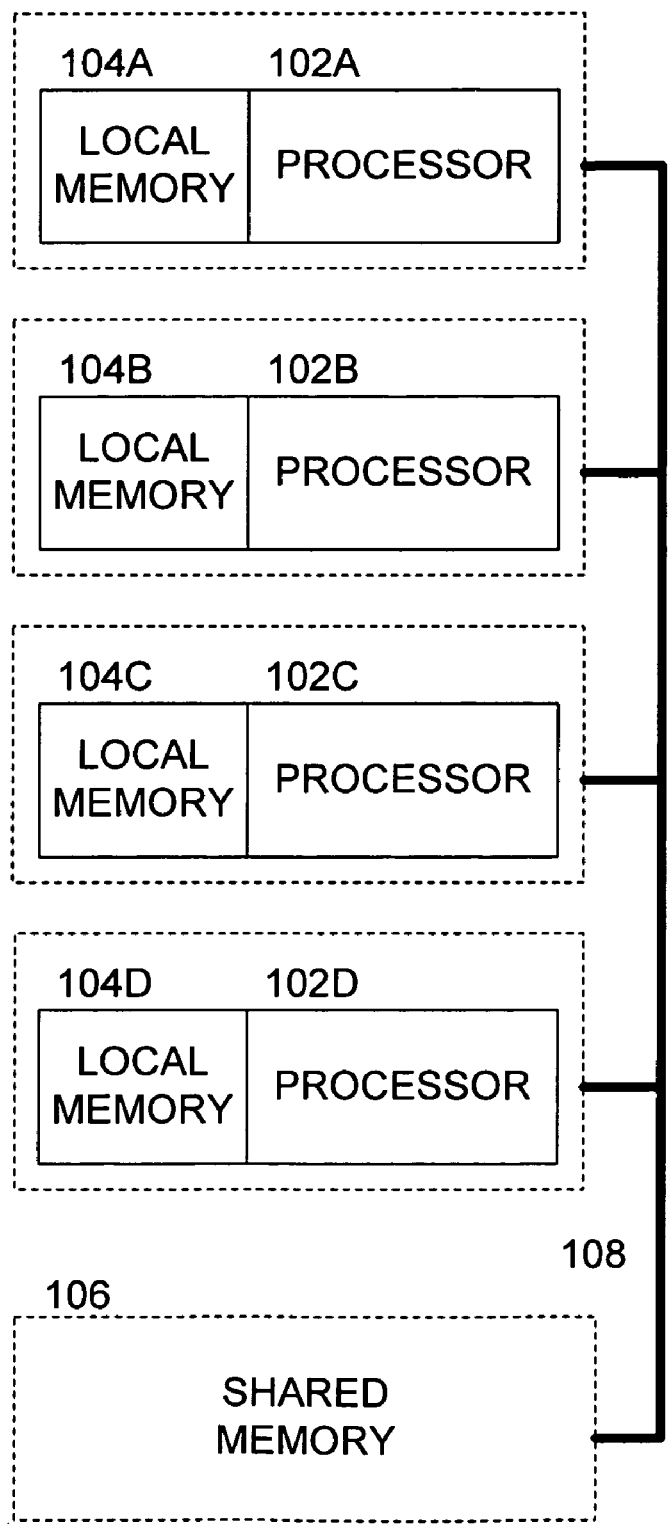
FIG. 1 is a block diagram illustrating the structure of a multi-processing system having two or more sub-processors that may be adapted in accordance with one or more aspects of the present invention.

With reference to the drawings, wherein like numerals indicate like elements, there is shown in FIG. 1 at least a portion of a processing system 100 that may be adapted for carrying out one or more features of the present invention. For the purposes of brevity and clarity, the block diagram of FIG. 1 will be referred to and described herein as illustrating an apparatus 100, it being understood, however, that the description may readily be applied to various aspects of a method with equal force.

The processing system 100 includes a plurality of processors 102A, 102B, 102C, and 102D, it being understood that any number of processors may be employed without departing from the spirit and scope of the invention. The processing system 100 also includes a plurality of local memories 104A, 104B, 104C, 104D and a shared memory 106. At least the processors 102, the local memories 104, and the shared memory 106 are preferably (directly or indirectly) coupled to one another over a bus system 108 that is operable to transfer data to and from each component in accordance with suitable protocols.

Each of the processors 102 may be of similar construction or of differing construction. The processors may be implemented utilizing any of the known technologies that are capable of requesting data from the shared (or system) memory 106, and manipulating the data to achieve a desirable result. For example, the processors 102 may be implemented using any of the known microprocessors that are capable of executing software and/or firmware, including standard microprocessors, distributed microprocessors, etc. By way of example, one or more of the processors 102 may be a graphics processor that is capable of requesting and manipulating data, such as pixel data, including gray scale information, color information, texture data, polygonal information, video frame information, etc.

One or more of the processors 102 of the system 100 may take on the role as a main (or managing) processor. The main processor may schedule and orchestrate the processing of data by the other processors.

The system memory 106 is preferably a dynamic random access memory (DRAM) coupled to the processors 102 through a memory interface circuit (not shown). Although the system memory 106 is preferably a DRAM, the memory 106 may be implemented using other means, e.g., a static random access memory (SRAM), a magnetic random access memory (MRAM), an optical memory, a holographic memory, etc.

Each processor 102 preferably includes a processor core and an associated one of the local memories 104 in which to execute programs. These components may be integrally disposed on a common semi-conductor substrate or may be separately disposed as may be desired by a designer. The processor core is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the processor core may include an instruction buffer, instruction decode circuitry, dependency check circuitry, instruction issue circuitry, and execution stages.

Each local memory 104 is coupled to its associated processor core 102 via a bus and is preferably located on the same chip (same semiconductor substrate) as the processor core. The local memory 104 is preferably not a traditional hardware cache memory in that there are no on-chip or off-chip hardware cache circuits, cache registers, cache memory controllers, etc. to implement a hardware cache memory function. As on chip space is often limited, the size of the local memory may be much smaller than the shared memory 106.

The processors 102 preferably provide data access requests to copy data (which may include program data) from the system memory 106 over the bus system 108 into their respective local memories 104 for program execution and data manipulation. The mechanism for facilitating data access may be implemented utilizing any of the known techniques, for example the direct memory access (DMA) technique. This function is preferably carried out by the memory interface circuit.

Figure 2:
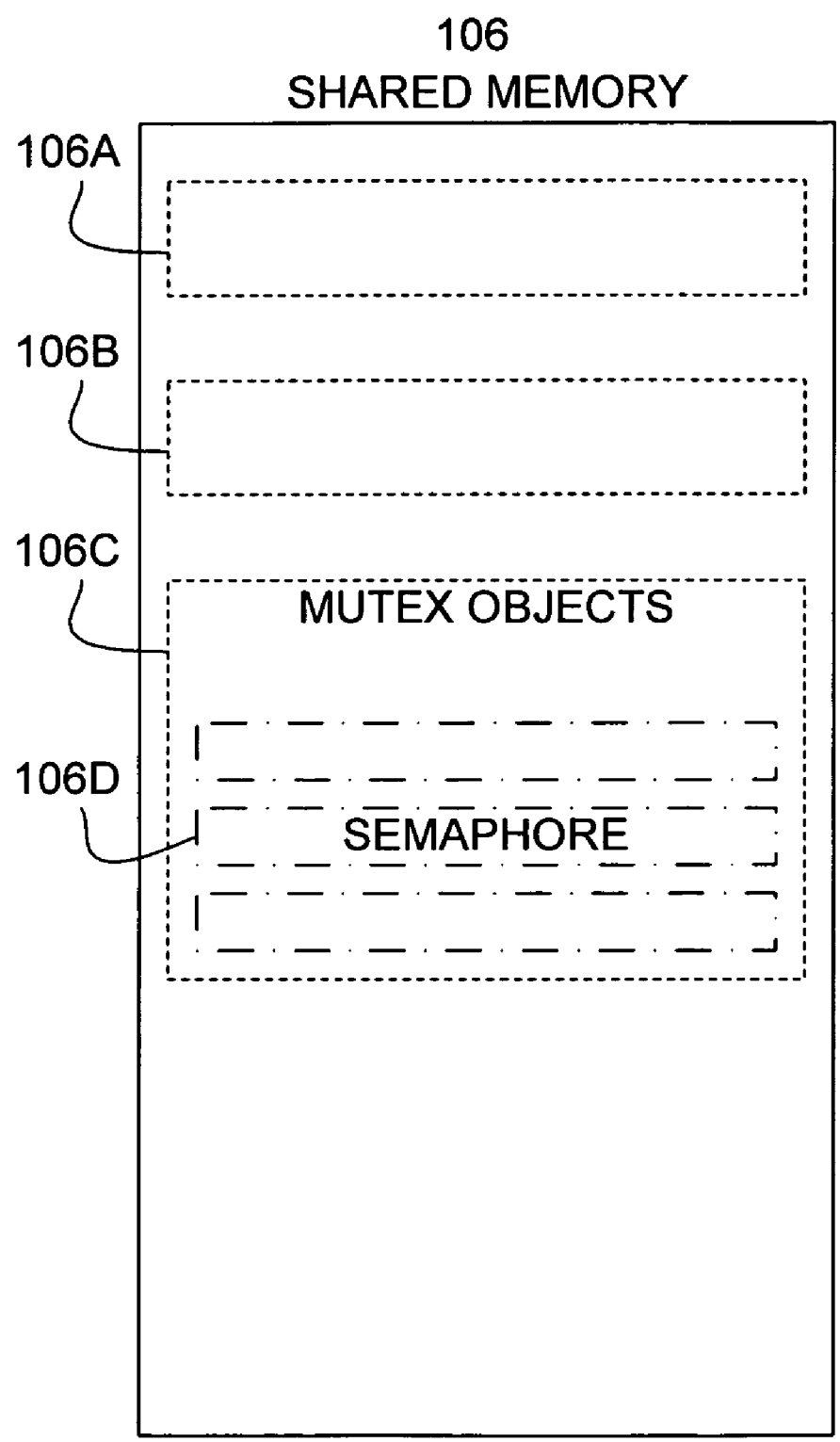
FIG. 2 is a block diagram illustrating the structure and operation of a shared memory of the processing system of FIG. 1 in accordance with one or more aspects of the present invention.

With reference to FIG. 2, the shared memory 106 may include one or more sub-areas 106A, 106B, 106C, etc. One of the areas 106C may be reserved for object oriented interface activities, such as creating mutual exclusion objects (mutex objects), which are useful in maintaining coherency among data in a shared memory. By way of example, a mutex object may be a semaphore 106D, such as a binary semaphore in which only one of the processors 102 is permitted to reserve the object. While conventional techniques for managing mutex objects involve a managing processor with unilateral authority to establish mutex objects, the present invention provides an alternative technique that may be employed either by a managing processor or may be managed by the plurality of processors 102.

With reference to FIG. 3, a memory allocation table (MAT) is preferably employed to manage the creation of a mutex object. One or more mutex objects may be established by way of respective segments of the shared memory 106 that may be reserved by one or more of the processors 102. Such reservation of one or more segments of the shared memory 106 may insure that any data within the reserved segments is protected if needed to meet coherency requirements. The MAT 110 is preferably a one-dimensional table including a plurality of entries (numbered 1, 2, 3, 4 . . . 15 for illustration purposes), and status information for each entry. Each entry in the MAT 110 is preferably associated with one or more segments of the shared memory 106, which segments may be individually or collectively reserved by one or more of the processors 102.

With reference to FIG. 4, the status information may take on at least one of a plurality of states, such as I=segment(s) available for reservation; N=segment(s) at least partially reserved; U=segment(s) reserved; and C=segment(s) continued. Each of these states will be discussed in more detail hereinbelow. Presently, however, it is noted that each status state is preferably represented in binary form as illustrated by the truth table of FIG. 4. Preferably, in an initialized state, each entry of the Mat 110 includes status information of I, whereby associated segment(s) of each entry are available for reservation. The initialization process may be performed by one of the processors 102 or may be performed by a main processor.

It is noted that the MAT 110 need not include an excessive amount of data to achieve management of the mutex objects of the shared memory 106. Indeed, each entry need only include a relatively small number of bits, such as two bits, representing the status of the given entry. Thus, the MAT 110 need not utilize a significant amount of space in a storage medium, such as some portion of the shared memory 106. Advantageously, the relatively small number of bits needed to fully define the MAT 110 permits the entire MAT 110 to be transferred between the shared memory 106 and the processors in one DMA transfer. Those skilled in the art will appreciate that conventional techniques for establishing an allocation table result in tables of very large size, which are unlikely to be transferable in one DMA cycle.

Figure 5:
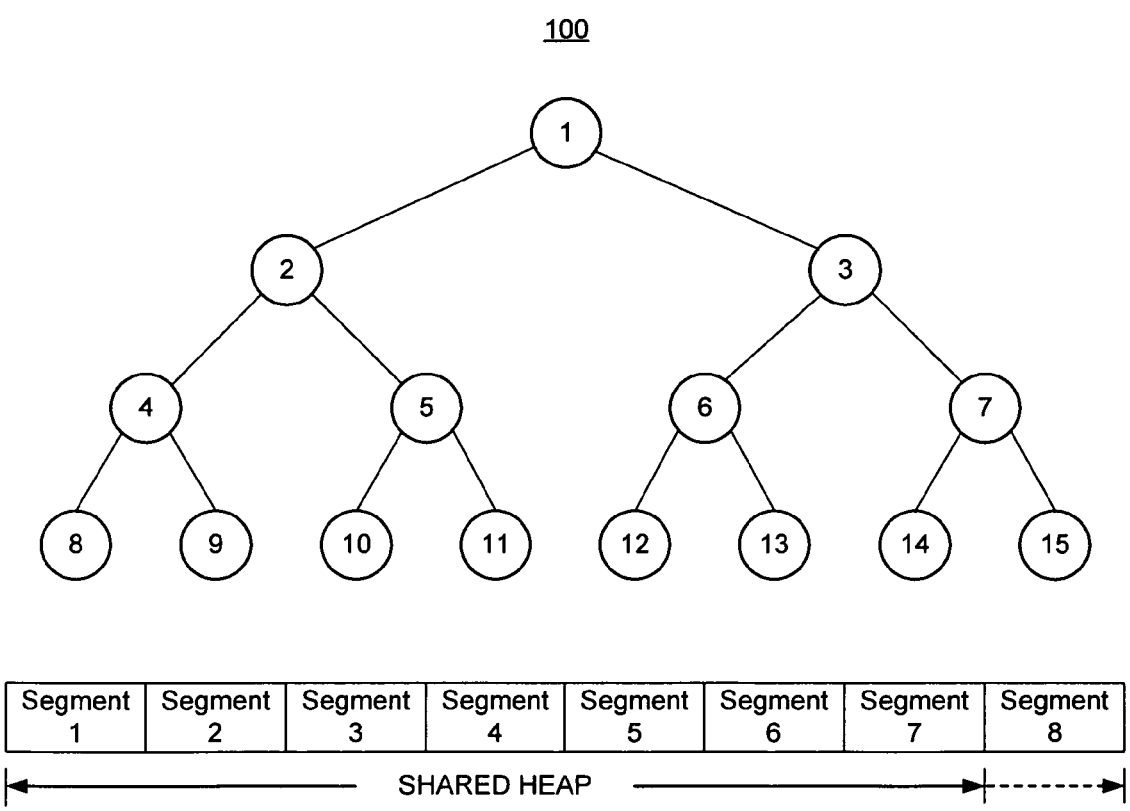
FIG. 5 is a binary tree diagram illustrating some properties of the memory allocation table of the processing system in accordance with one or more aspects of the present invention.

With reference to FIG. 5, each entry of the MAT 110 is preferably associated with a respective node in a binary tree such that the nodes and the entries are grouped into hierarchical levels, level 0, level 1, level 2, level 3, etc. The root node, node 1, is at level 0 (at the top of the binary tree) and represents the maximum allocation space of the shared memory. This maximum allocation space may be referred to as a shared heap. Node 1 is associated with entry 1 in the MAT 110. Intermediate nodes 2 and 3, which depend from node 1, are associated with entries 2 and 3, respectively, of the MAT 110. Nodes 2 and 3 are at level 1 and each node represents one half of the maximum allocation space (in this example, four segments of the shared memory 106). Intermediate nodes 4 and 5, which depend from node 2, and intermediate nodes 6 and 7, which depend from node 3, are associated with entries 4, 5, 6, and 7, respectively, of the MAT 110. Each of these nodes represents one fourth of the maximum allocation space (in this example, two segments of the shared memory 106).

Assuming that there are only four levels in the tree, nodes 8-15 are terminal nodes, meaning that there are no further nodes depending therefrom. Terminal nodes 8 and 9 depend from node 4, terminal nodes 10 and 11 depend from node 5, terminal nodes 12 and 13 depend from node 6, and terminal nodes 14 and 15 depend from node 7. Each of these nodes are associated with entries 8, 9, 10, 11, 12, 13, 14, and 15, respectively, of the MAT 110. Each of these nodes represents one eighth of the maximum allocation space (in this example, one segment of the shared memory 106).

In keeping with the example above, and assuming, for example, a maximum allocation size of 8 KB, each terminal node (e.g., nodes 8-15) represents a 1 KB segment of the shared memory 106 that may be reserved (or allocated), which is to say that the granularity of the allocation is 1 KB. Thus, the size of the MAT 110 is approximately equal to the number of nodes (entries) times the number of bits representing the status information for each entry. The number of nodes (entries) may be computed utilizing the following formula: $2^L-1$, where L is the number of levels in the binary tree. Thus, in the example discussed thus far, the size of the MAT 110 is 15×2=30 bits.

Figure 6:
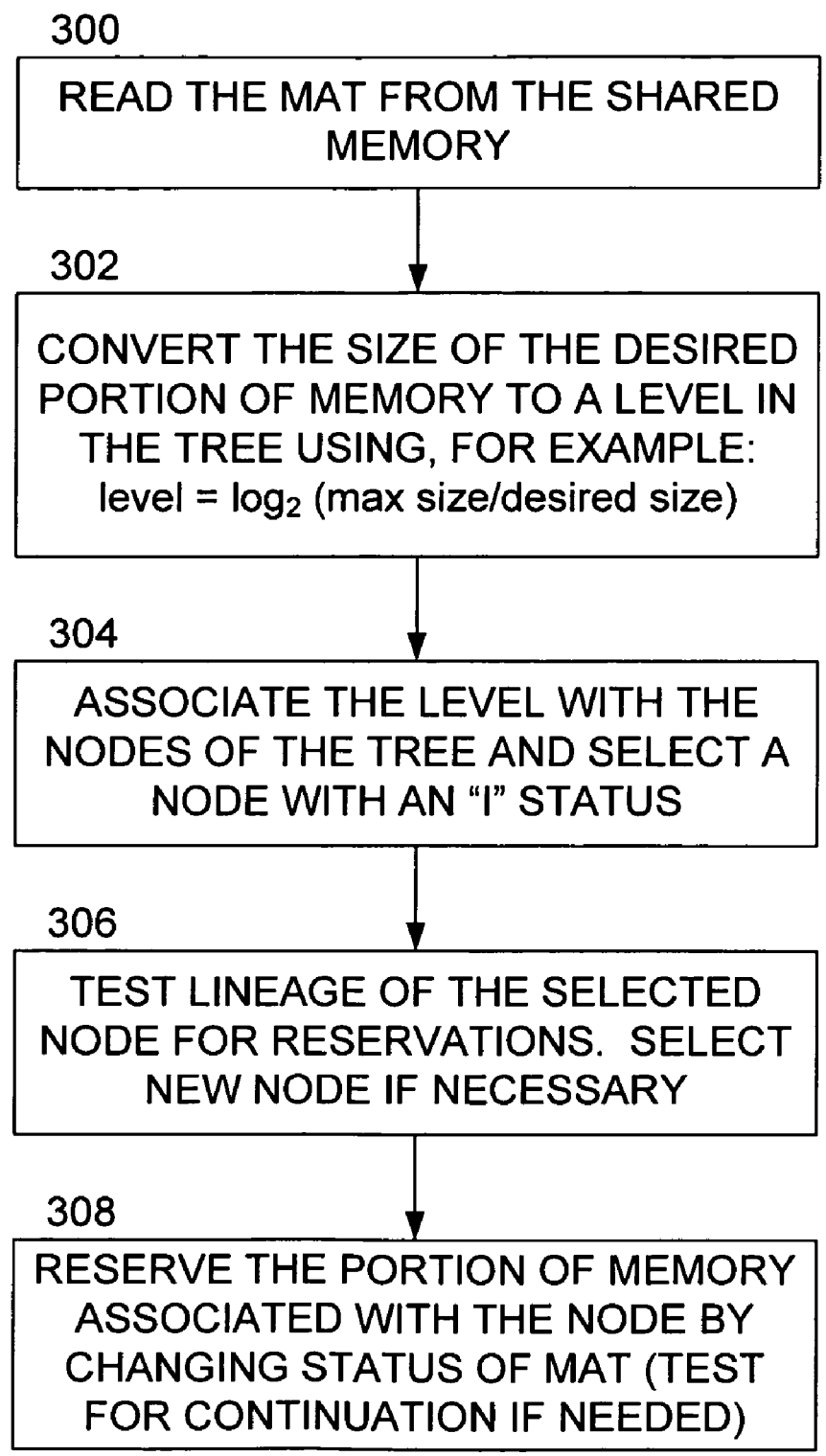
FIG. 6 is a flow diagram illustrating process steps that may be carried out in accordance with one or more aspects of the present invention.

Reference is now made to FIG. 6, which is a flow diagram illustrating processing steps that may be carried out by one or more of the processors 102 in order to utilize the MAT 110 to manage mutex objects within the shared memory 106. By way of example, the creation of a number of binary semaphores utilizing segments of the shared memory 106 will now be discussed. At action 300, the MAT 110 is preferably read from a storage medium, such as the shared memory 106 into one of the processors 102, such as the local memory 104 thereof. At action 302, the size of the desired portion of memory in which to create the binary semaphore is converted into a level of the binary tree, which is to say a level within the MAT 110. It is preferred that the level of the MAT 110 is computed based on the following formula: level=$\text{Log}_2$ (M/D), where M is the maximum size of the shared memory available for reservation (the maximum allocation space) and D is the desired size of the shared memory to be reserved (e.g., the size of the semaphore). Utilizing the parameters of the example hereinabove, it is assumed for the purposes of discussion that the maximum size M of the available space is 8 KB and the desired size D of the semaphore is 1 KB (i.e., one segment of the shared memory 106). Thus, the level=$\text{Log}_2$ (8 KB/1 KB)=$\text{Log}_2$ (8)=3.

At action 304, the computed level of the MAT 110 is associated with a number of entries within the MAT 110 in order to form a group of entries from which one entry is selected. With reference to FIG. 5, the nodes associated with level 3 are nodes 8-15. The group of entries within the MAT 110 associated with the computed level 3 includes entries 8-15. One of these entries is selected based upon the status information thereof. In particular, one of the entries in the group having status information indicating that the one or more segments of the shared memory 106 associated with the selected entry are available for reservation is selected. As it is assumed that the MAT 110 is in the initialized state (FIG. 3), any of entries 8-15 may be selected. Indeed, the status information associated with each of these entries is I, whereby the segment associated with each entry is available for reservation. It is noted that any useful scheme for selecting one of the entries of the group may be utilized without departing from the spirit and scope of the present invention. For example, a sequential scan through the entries of the group may be made, whereby the first entry encountered having status information of I may be selected.

It is preferred that the selection of one entry within the group is only a provisional selection in that further processing is to be carried out before the selection is finalized and the associated segment of the shared memory 106 is reserved. For the purposes of illustration, it is assumed that circumstances, the evaluation of a sequentially higher level entry is preferably continued.

Turning to FIG. 5, the next higher level node, the parent node of node 2, is node 1, which is at level 0. The parent entry of entry 2 is INTEGER (2/2)=entry 1. Turning to FIG. 3, the status information of node 1 is I, indicating that the segments associated with entry 1 (i.e., the segments associated with entries 8-15—all the segments) are available for reservation. As there are no higher level entries in the lineage of entry 8 of the MAT 110, the evaluation preferably terminates. Under these circumstances, entry 8 may be selected and the segment of the shared memory 106 associated with entry 8 may be selected and reserved.

With reference to FIG. 7, in order to facilitate further management of the mutex objects and creation of further semaphores, the MAT 110 is preferably modified to record certain aspects of the actions taken with respect to the reservation of the segment of the shared memory 106 reserved in connection with entry 8 of the MAT 110. In particular, the status information of entry 8 of the MAT 110 is preferably modified from I to U, which indicates that the segment of the shared memory 106 associated with entry 8 has been reserved. Further, as the evaluation of the higher level entries in the lineage of entry 8 reached the highest level entry, entry 1 (corresponding to the root node 1 of the binary tree), further modifications to the MAT 110 are preferably made. In particular, the status information of each entry in the lineage of entry 8, entries 4, 2, and 1 in this example, is preferably changed from I to N, indicating that at least one of the segments associated with such entries is reserved. The significance of the changes in status of entries 4, 2 and 1 will be discussed in more detail in connection with reserving further segment(s) herein below.

With reference to FIGS. 7-8, another semaphore of 1 KB size may be created by reading in the MAT 110 from the shared memory 106, computing a level corresponding to the size of the desired portion of memory to be reserved, and establishing a group of entries of the MAT 110 associated with such computed level. In this example, the computed level is L=$\text{Log}_2$ (8 KB/1 KB)=3. The group of entries associated with level 3 in the MAT 110 includes entries 8-15. A sequential evaluation of the status of entries 8-15 (see FIG. 7) reveals that entry 9 contains a status of I, indicating that the segment associated with that entry is available for reservation. Next, the status information of higher level entries in the lineage of entry 9 is evaluated. In particular, the parent entry of entry 9 is computed as parent entry=INTEGER (9/2)=4. The status information of entry 4 is evaluated and found to be N, indicating that at least one of the segments associated with a lower level entry associated with entry 4 has been reserved but not all of the memory segments associated with entry 4 were reserved. Under these circumstances, the evaluation of higher level entries in the lineage may be terminated. This is so because the first occurrence of status N insures that the segment of the shared memory 106 associated with the provisionally selected entry 9 is available for reservation. In response, the status information associated with entry 9 is changed from I to U, (see FIG. 8) indicating that the segment of the shared memory 106 associated with entry 9 has been reserved. The MAT 110 is then preferably written back to the shared memory 106.

With reference to FIGS. 8-9, another semaphore of, for example, 2 KB size may be created by reading in the MAT 110 from the shared memory 106, computing a level corresponding to the size of the desired portion of memory to be reserved, and establishing a group of entries of the MAT 110 associated with such computed level. In this example, the computed level is $L=\text{Log}_2 (8 \text{ KB}/2 \text{ KB})=2$. The group of entries associated with level 2 in the MAT 110 includes entries 4, 5, 6, and 7. A sequential evaluation of the status of entries 4, 5, 6, and 7 (see FIG. 8) reveals that entry 5 contains a status of I, indicating that the segment associated with that entry is available for reservation. Next, the status information of higher level entries in the lineage of entry 5 is evaluated. In particular, the parent entry of entry 5 is computed as parent entry=INTEGER (5/2)=2. The status information of entry 2 is evaluated and found to be N, indicating that at least one of the segments associated with a lower level entry associated with entry 2 has been reserved but not all of the memory segments associated with entry 2 were reserved. Under these circumstances, the evaluation of higher level entries in the lineage may be terminated. Again, this is so because the first occurrence of status N insures that the segment of the shared memory 106 associated with the provisionally selected entry 5 is available for reservation. In response, the status information associated with entry 5 is changed from I to U, (see FIG. 9) indicating that the segment of the shared memory 106 associated with entry 5 has been reserved. The MAT 110 is then written back to the shared memory 106.

With reference to FIG. 5, the discussion of the examples herein above has assumed that the size of the maximum memory available for reservation (e.g., the shared heap size) has been a power of two. Thus, each terminal node at the lowest level, nodes 8-15, was associated with a respective segment of the shared memory 106. In general, however, the size of the shared heap may not be a factor of two, whereby one or more of the terminal nodes of the tree (and one or more of the entries of the MAT 110) may not be associated with a segment of the shared memory 106. By way of example, the size of the shared heap may include only seven segments, whereby node/entry 15 is not associated with a segment of the shared heap. In this scenario, the entries of the MAT 110 preferably reflect that node 15 is not associated with a segment of the shared heap.

The MAT 110 may be revised to reflect that no segment of the shared memory is associated with entry 15. Entry 15 may be "provisionally" selected. The next higher level entry in the MAT 110 from entry 15 is parent node=INTEGER (15/2) =entry 7. The status information of entry 7 of the MAT 110 is preferably evaluated. Turning to FIG. 9, the status information of entry 7 is I, whereby the segments associated therewith (i.e., the segments associates with entries 14 and 15) are available for reservation. As entry 7 did not contain a status of U or N, the evaluation is preferably continued at a sequentially higher level. The parent entry of entry 7 is INTEGER (7/2)=entry 3. The status information of entry 3 is I, indicating that the segments associated therewith (i.e., the segments associated with entries 6-7) are available for reservation. Again, entry 3 did not contain a status of U or N, the evaluation is preferably continued at a sequentially higher level. The parent entry of entry 3 is INTEGER (3/2)=entry 1. The status information of node 1 is N, indicating that one or more of the segments associated with entry 1 have been reserved but not all such segments have been reserved. As the parent entry (entry 1) had a status of N (and was the root node), the evaluation preferably terminates.

The status information of entry 15 of the MAT 110 is preferably modified from I to U (see FIG. 10), which ensures that entry 15 will no longer be available for provisional or final selection. Further, as the evaluation of the higher level entries in the lineage of entry 15 reached the highest level entry, entry 1 (corresponding to the root node 1 of the binary tree), the status information of each entry in the lineage of entry 15, entries 7 and 3 is preferably changed from I to N, indicating that at least one of the segments associated with such entries is reserved.

Figure 10:
Figure 11:

With reference to FIGS. 10-11, another semaphore of 1 KB size may be created by reading in the MAT 110 from the shared memory 106, computing a level corresponding to the size of the desired portion of memory to be reserved, and establishing a group of entries of the MAT 110 associated with such computed level. In this example, the computed level is $L=\text{Log}_2 (8 \text{ KB}/1 \text{ KB})=3$. The group of entries associated with level 3 in the MAT 110 includes entries 8-15. A sequential evaluation of the status of entries 8-15 (see FIG. 10) reveals that entry 10 contains a status of I, indicating that the segment associated with that entry is available for reservation. Next, the status information of higher level entries in the lineage of entry 10 is evaluated. In particular, the parent entry of entry 10 is computed as parent entry=INTEGER (10/2)=5. The status information of entry 5 is evaluated and found to be U, indicating that the segments associated with both entries 10 and 11 have been reserved.

Thus, another entry in the group is provisionally selected, e.g., entry 11. This yields the same result: parent entry 5 has a status of U. Thus, yet another entry in the group is provisionally selected, e.g., entry 12. The parent entry is INTEGER (12/2)=6. The status information of entry 6, is evaluated and found to be N, indicating that at least one of the segments associated with a lower level entry associated with entry 6 has been reserved but not all of the memory segments associated with entry 6 were reserved. As the first occurrence of status N insures that the segment of the shared memory 106 associated with the provisionally selected entry 12 is available for reservation, the evaluation of higher level entries in the lineage may be terminated. Next, the status information associated with entry 12 is changed from I to U (see FIG. 11), indicating that the segment of the shared memory 106 associated with entry 12 has been reserved. The MAT 110 is then preferably written back to the shared memory 106.

Figure 12:

With reference to FIGS. 11-12, it may be desirable to create another semaphore of, for example, 2 KB size. In keeping with the examples hereinabove, there are only two segments of the shared memory 106 available for reservation, namely the segments associated with entries 10 and 11 of the MAT 110. It is noted, however, that additional processing techniques are preferably used to reserve these segments. This is so because the technique presented hereinabove to reserve a 2 KB sized semaphore under the circumstances presented in FIGS. 11-12 will lead to an incomplete result. In particular, in this example, the computed level is $L=\text{Log}_2 (8 \text{ KB}/2 \text{ KB})=2$. The group of entries associated with level 2 in the MAT 110 includes entries 4, 5, 6, and 7. A sequential evaluation of the status of entries 4, 5, 6, and 7 (see FIG. 11) reveals that no entry contains a status of I, indicating that segments associated with that entry are available for reservation. Thus, the entries having a status of N are preferably further evaluated to determine whether any lower level entries (child entries) in their lineage have a status of I and whether such entries are adjacent to one another. The first entry in the group having a status of N is entry 4. The child entries of entry 4 are computed to be 4×2=8 and 4×2+1=9. Entries 8 and 9 both have a status of U. Thus, another entry in the group is provisionally selected. The second entry in the group having a status of N is entry 6. The child entries of entry 6 are computed to be 6×2=12 and 6×2+1=13. Entry 12 has a status of U, but entry 13 has a status of I. Thus, entry 13 might be a candidate for reservation. Next, another entry in the group is provisionally selected. The third entry in the group having a status of N is entry 7. The child entries of entry 7 are computed to be 7×2=14 and 7×2+1=15. Entry 15 has a status of U, but entry 14 has a status of I. Thus, entry 14 might be a candidate for reservation. Next, a determination is made as to whether the two candidate entries, entry 13 and entry 14, are adjacent to one another. They are. Thus, the evaluation of further entries may be terminated. The status information associated with entries 13 and 14 are changed from I to U and C (see FIG. 12), respectively. As with the previous examples, the status of U in entry 13 indicates that the segment of the shared memory 106 associated with entry 13 has been reserved. The status of C in entry 14 also indicates that the segment of the shared memory 106 associated with entry 14 has been reserved, but it also indicates that the segment is associated with segment of entry 13.

In accordance with one or more further embodiments of the present invention, and with reference to FIG. 13, the reserved objects defined by the MAT 110 are preferably shared entry 8 is provisionally selected because it is the first entry in the group that contains status information indicating that the segment associated therewith is available for reservation. At action 306, the lineage of the provisionally selected entry 8 is tested to determine whether the segment associated therewith may be in fact reserved. In particular, this may entail evaluating the status information of one or more higher level entries in the lineage of the provisionally selected entry 8 to determine whether the status information of such higher level entries indicates that the segment associated with the provisionally selected entry 8 is available for reservation.

With reference to FIG. 5, the next higher level node (the parent node) of node 8 is node 4, which is at level 2. Thus, the next higher level entry in the MAT 110 from entry 8 is entry 4. It is possible to mathematically calculate the parent entry from any entry in the MAT 110 according to the following formula: parent node=INTEGER (current node/2). The status information of entry 4 of the MAT 110 is preferably evaluated. Turning to FIG. 3, the status information of node 4 is I, whereby the segments associated with entry 4 (i.e., the segments associates with entries 8 and 9) are available for reservation. As no final determination can be made under these circumstances, the evaluation is preferably continued at a sequentially higher level.

Turning to FIG. 5, the next higher level node (the parent node) of node 4 is node 2, which is at level 1. The parent entry of entry 4 is INTEGER (4/2)=entry 2. Turning to FIG. 3, the status information of entry 2 is I, indicating that the segments associated with entry 2 (i.e., the segments associated with entries 8-11) are available for reservation. Again, as a final determination cannot be made under these among a plurality of processors of a system. FIG. 13 is a block diagram illustrating the structure of key table 112 that may be implemented in the multi-processing system of FIG. 1 (or other embodiments), in order to share the reserved objects among the processors of the system. The key table 112 includes a plurality of entries, where each entry includes an object name OBJECT 0, OBJECT 1, OBJECT 2 . . . OBJECT N, as well as the associated nodes that have been selected to reserve the underlying segments of the shared memory 106. Using the MAT 110 of FIG. 12 as an example (with the exception of permitting node 15 for reservation), the corresponding key table 112 would include the entries shown in FIG. 13. In particular, OBJECT 0 is the name of a shared object in which node 8 of the shared memory has been reserved. Similarly, OBJECT 1 is the name of a reserved object in which node 9 of the shared memory 106 has been reserved. In order to share the reserved objects among the processors 102 of the multi-processing system 100, the key table 112 is preferably utilized in conjunction with the MAT 110 in order to utilize existing objects as well as creating additional objects.

Figure 14:
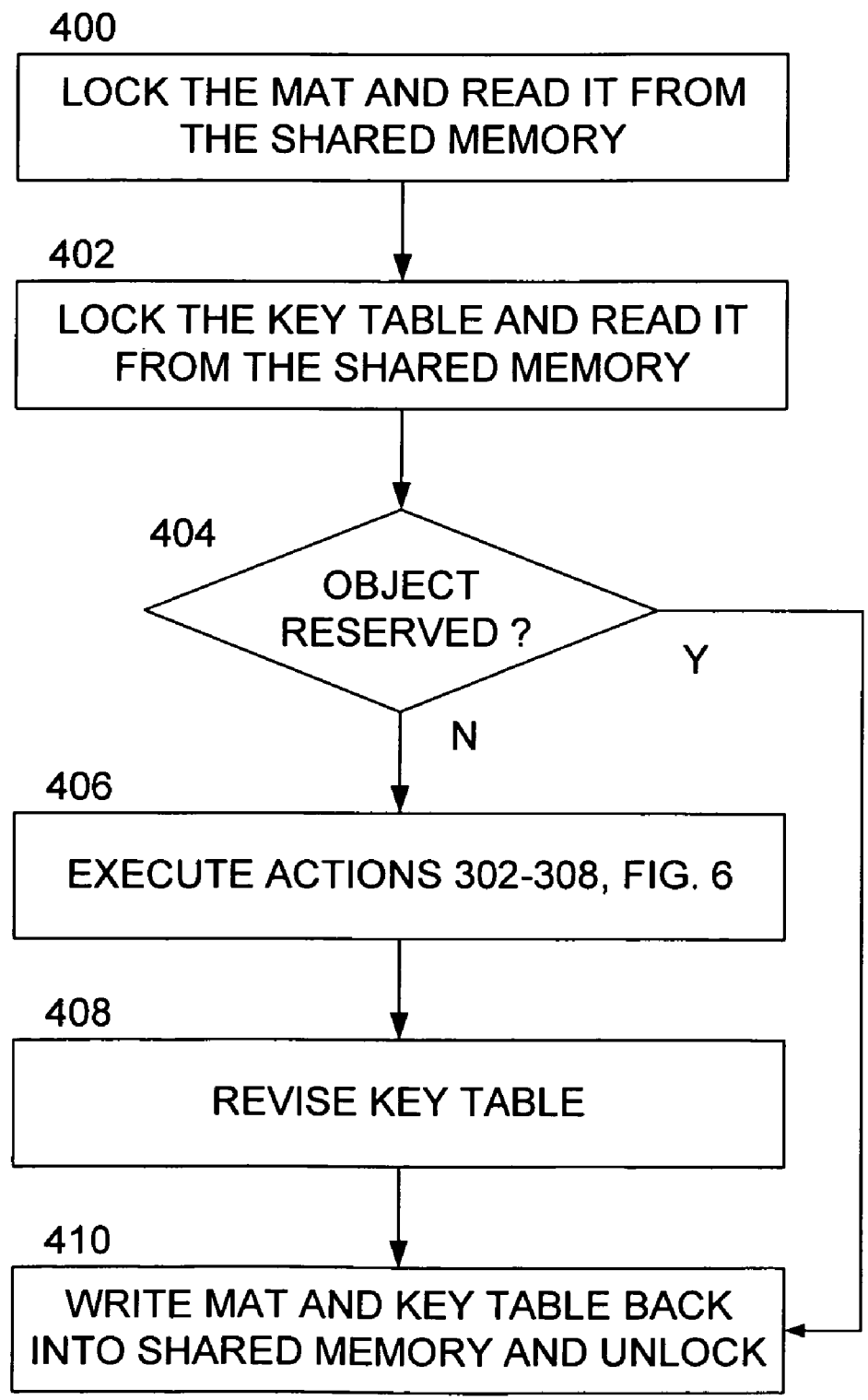
FIG. 14 is a flow diagram illustrating process steps that may be carried out in order to share the reserved objects among the processors of the system in accordance with one or more further aspects of the present invention.

FIG. 14 is a flow diagram illustrating process steps that may be utilized by the embodiments herein in order to share the reserved objects among, for example, the processors 102 of the system 100. At action 400, the MAT 110 is locked within the shared memory 106, meaning that only the processor 102 that reads the MAT 110 from the shared memory 106 may manipulate same until the MAT 110 is unlocked. Thus, another processor 102 may not access the MAT 110 while the MAT 110 is locked. At action 402, the key table 112 is locked and read from the shared memory 106 into the processor 102 that read the MAT 110.

At action 404, a determination is made as to whether the desired object has already been reserved. This preferably entails reviewing the object names within the key table 112 to determine whether any associated nodes have already been reserved. For example, if a given processor 102 (or task) seeks to use OBJECT 2, then it searches for that name under the object names within the key table 112 and checks the associated node names to determine whether any nodes (or segments) of the shared memory 106 have been reserved. In this example, node 5 has been reserved with respect to OBJECT 2. Notable, nodes 10 and 11, which are associated with node 5 at a lower level may also be implicated when node 5 is reserved. If the result of the determination at action 404 is in the affirmative, then the process flow preferably advances to action 410, where the MAT 110 and the key table 112 are written back into the shared memory 106 and unlocked. Thereafter, the processor seeking to utilize OBJECT 2 may do so by utilizing the segments associated with nodes 5, 10, and 11 of the shared memory 106.

On the other hand, if the result of the determination at action 404 is in the negative, then the process flow preferably advances to action 406, where actions 302-308 of FIG. 6 are carried out. In other words, a new object is formed by reserving further nodes/segments of the shared memory 106. At action 408, the key table 112 is revised to reflect the node and memory segment reservations that were carried out during actions 302-308 of FIG. 6. For example, it may be that such actions result in the formation of a new OBJECT 5, where node 15 (and the memory segment(s) associated therewith) are reserved. Thus, the key table 112 is preferably updated to reflect that OBJECT 5 is associated with node 15. The process flow then advances to action 410, where the MAT 110 and the key table 112 are written back into the shared memory 106 and unlocked.

A description of a preferred computer architecture for a multi-processor system will now be provided that is suitable for carrying out one or more of the features discussed herein. In accordance with one or more embodiments, the multi-processor system may be implemented as a single-chip solution operable for stand-alone and/or distributed processing of media-rich applications, such as game systems, home terminals, PC systems, server systems and workstations. In some applications, such as game systems and home terminals, real-time computing may be a necessity. For example, in a real-time, distributed gaming application, one or more of networking image decompression, 3D computer graphics, audio generation, network communications, physical simulation, and artificial intelligence processes have to be executed quickly enough to provide the user with the illusion of a real-time experience. Thus, each processor in the multi-processor system must complete tasks in a short and predictable time.

To this end, and in accordance with this computer architecture, all processors of a multi-processing computer system are constructed from a common computing module (or cell). This common computing module has a consistent structure and preferably employs the same instruction set architecture. The multi-processing computer system can be formed of one or more clients, servers, PCs, mobile computers, game machines, PDAs, set top boxes, appliances, digital televisions and other devices using computer processors.

A plurality of the computer systems may also be members of a network if desired. The consistent modular structure enables efficient, high speed processing of applications and data by the multi-processing computer system, and if a network is employed, the rapid transmission of applications and data over the network. This structure also simplifies the building of members of the network of various sizes and processing power and the preparation of applications for processing by these members.

Figure 15:
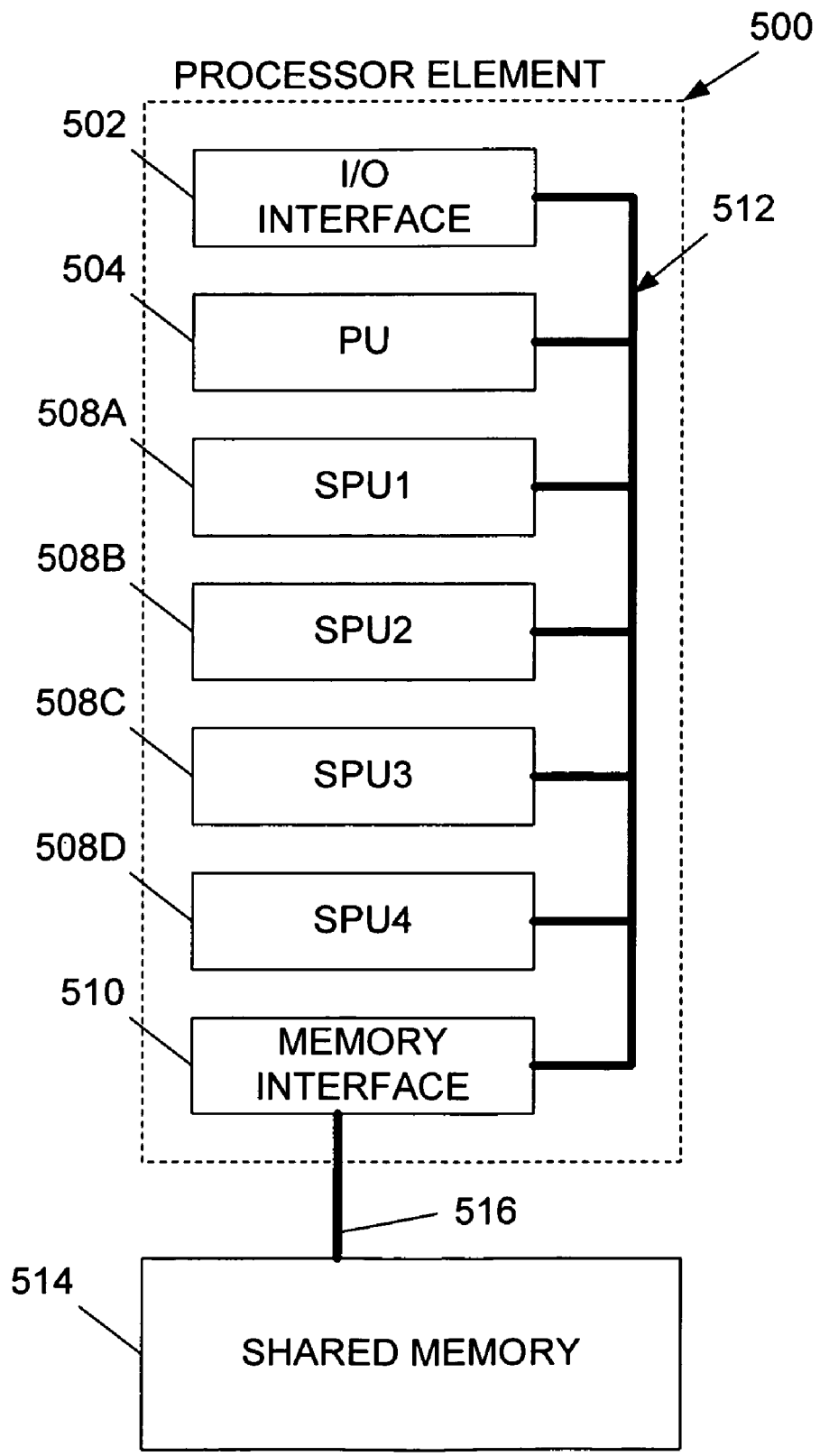
FIG. 15 is a diagram illustrating a preferred processor element (PE) that may be used to implement one or more further aspects of the present invention.

With reference to FIG. 15, the basic processing module is a processor element (PE) 500. The PE 500 comprises an I/O interface 502, a processing unit (PU) 504, and a plurality of sub-processing units 508, namely, sub-processing unit 508A, sub-processing unit 508B, sub-processing unit 508C, and sub-processing unit 508D. A local (or internal) PE bus 512 transmits data and applications among the PU 504, the sub-processing units 508, and a memory interface 511. The local PE bus 512 can have, e.g., a conventional architecture or can be implemented as a packet-switched network. If implemented as a packet switch network, while requiring more hardware, increases the available bandwidth.

The PE 500 can be constructed using various methods for implementing digital logic. The PE 500 preferably is constructed, however, as a single integrated circuit employing a complementary metal oxide semiconductor (CMOS) on a silicon substrate. Alternative materials for substrates include gallium arsinide, gallium aluminum arsinide and other so-called III-B compounds employing a wide variety of dopants. The PE 500 also may be implemented using superconducting material, e.g., rapid single-flux-quantum (RSFQ) logic.

The PE 500 is closely associated with a shared (main) memory 514 through a high bandwidth memory connection 516. Although the memory 514 preferably is a dynamic random access memory (DRAM), the memory 514 could be implemented using other means, e.g., as a static random access memory (SRAM), a magnetic random access memory (MRAM), an optical memory, a holographic memory, etc.

The PU 504 and the sub-processing units 508 are preferably each coupled to a memory flow controller (MFC) including direct memory access DMA functionality, which in combination with the memory interface 511, facilitate the transfer of data between the DRAM 514 and the sub-processing units 508 and the PU 504 of the PE 500. It is noted that the DMAC and/or the memory interface 511 may be integrally or separately disposed with respect to the sub-processing units 508 and the PU 504. Indeed, the DMAC function and/or the memory interface 511 function may be integral with one or more (preferably all) of the sub-processing units 508 and the PU 504. It is also noted that the DRAM 514 may be integrally or separately disposed with respect to the PE 500. For example, the DRAM 514 may be disposed off-chip as is implied by the illustration shown or the DRAM 514 may be disposed on-chip in an integrated fashion.

The PU 504 can be, e.g., a standard processor capable of stand-alone processing of data and applications. In operation, the PU 504 preferably schedules and orchestrates the processing of data and applications by the sub-processing units. The sub-processing units preferably are single instruction, multiple data (SIMD) processors. Under the control of the PU 504, the sub-processing units perform the processing of these data and applications in a parallel and independent manner. The PU 504 is preferably implemented using a PowerPC core, which is a microprocessor architecture that employs reduced instruction-set computing (RISC) technique. RISC performs more complex instructions using combinations of simple instructions. Thus, the timing for the processor may be based on simpler and faster operations, enabling the microprocessor to perform more instructions for a given clock speed.

It is noted that the PU 504 may be implemented by one of the sub-processing units 508 taking on the role of a main processing unit that schedules and orchestrates the processing of data and applications by the sub-processing units 508. Further, there may be more than one PU implemented within the processor element 500.

In accordance with this modular structure, the number of PEs 500 employed by a particular computer system is based upon the processing power required by that system. For example, a server may employ four PEs 500, a workstation may employ two PEs 500 and a PDA may employ one PE 500. The number of sub-processing units of a PE 500 assigned to processing a particular software cell depends upon the complexity and magnitude of the programs and data within the cell.

Figure 16:
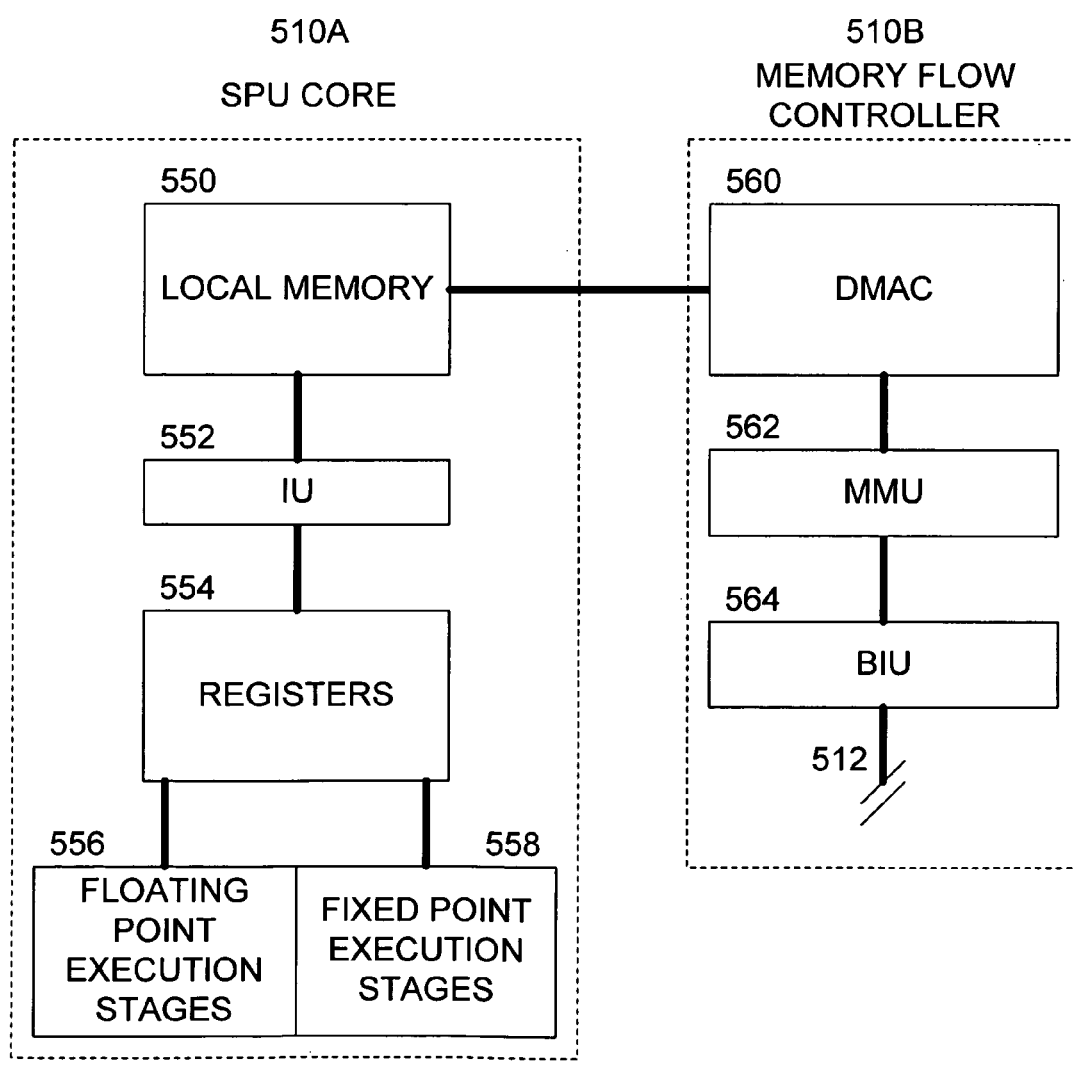
FIG. 16 is a diagram illustrating the structure of an exemplary sub-processing unit (SPU) of the system of FIG. 15 that may be adapted in accordance with one or more further aspects of the present invention.

FIG. 16 illustrates the preferred structure and function of a sub-processing unit (SPU) 508. The SPU 508 architecture preferably fills a void between general-purpose processors (which are designed to achieve high average performance on a broad set of applications) and special-purpose processors (which are designed to achieve high performance on a single application) The SPU 508 is designed to achieve high performance on game applications, media applications, broadband systems, etc., and to provide a high degree of control to programmers of real-time applications. Some capabilities of the SPU 508 include graphics geometry pipelines, surface subdivision, Fast Fourier Transforms, image processing keywords, stream processing, MPEG encoding/decoding, encryption, decryption, device driver extensions, modeling, game physics, content creation, and audio synthesis and processing.

The sub-processing unit 508 includes two basic functional units, namely an SPU core 510A and a memory flow controller (MFC) 510B. The SPU core 510A performs program execution, data manipulation, etc., while the MFC 510B performs functions related to data transfers between the SPU core 510A and the DRAM 514 of the system.

The SPU core 510A includes a local memory 550, an instruction unit (IU) 552, registers 554, one ore more floating point execution stages 556 and one or more fixed point execution stages 558. The local memory 550 is preferably implemented using single-ported random access memory, such as an SRAM. Whereas most processors reduce latency to memory by employing caches, the SPU core 510A implements the relatively small local memory 550 rather than a cache. Indeed, in order to provide consistent and predictable memory access latency for programmers of real-time applications (and other applications as mentioned herein) a cache memory architecture within the SPU 508A is not preferred.

The cache hit/miss characteristics of a cache memory results in volatile memory access times, varying from a few cycles to a few hundred cycles. Such volatility undercuts the access timing predictability that is desirable in, for example, real-time application programming. Latency hiding may be achieved in the local memory SRAM 550 by overlapping DMA transfers with data computation. This provides a high degree of control for the programming of real-time applications. As the latency and instruction overhead associated with DMA transfers exceeds that of the latency of servicing a cache miss, the SRAM local memory approach achieves an advantage when the DMA transfer size is sufficiently large and is sufficiently predictable (e.g., a DMA command can be issued before data is needed).

A program running on a given one of the sub-processing units 508 references the associated local memory 550 using a local address, however, each location of the local memory 550 is also assigned a real address (RA) within the overall system's memory map. This allows Privilege Software to map a local memory 550 into the Effective Address (EA) of a process to facilitate DMA transfers between one local memory 550 and another local memory 550. The PU 504 can also directly access the local memory 550 using an effective address. In a preferred embodiment, the local memory 550 contains 556 kilobytes of storage, and the capacity of registers 552 is 128×128 bits.

The SPU core 504A is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the IU 552 includes an instruction buffer, instruction decode circuitry, dependency check circuitry, and instruction issue circuitry.

The instruction buffer preferably includes a plurality of registers that are coupled to the local memory 550 and operable to temporarily store instructions as they are fetched. The instruction buffer preferably operates such that all the instructions leave the registers as a group, i.e., substantially simultaneously. Although the instruction buffer may be of any size, it is preferred that it is of a size not larger than about two or three registers.

In general, the decode circuitry breaks down the instructions and generates logical micro-operations that perform the function of the corresponding instruction. For example, the logical micro-operations may specify arithmetic and logical operations, load and store operations to the local memory 550, register source operands and/or immediate data operands. The decode circuitry may also indicate which resources the instruction uses, such as target register addresses, structural resources, function units and/or busses. The decode circuitry may also supply information indicating the instruction pipeline stages in which the resources are required. The instruction decode circuitry is preferably operable to substantially simultaneously decode a number of instructions equal to the number of registers of the instruction buffer.

The dependency check circuitry includes digital logic that performs testing to determine whether the operands of given instruction are dependent on the operands of other instructions in the pipeline. If so, then the given instruction should not be executed until such other operands are updated (e.g., by permitting the other instructions to complete execution). It is preferred that the dependency check circuitry determines dependencies of multiple instructions dispatched from the decoder circuitry 112 simultaneously.

The instruction issue circuitry is operable to issue the instructions to the floating point execution stages 556 and/or the fixed point execution stages 558.

The registers 554 are preferably implemented as a relatively large unified register file, such as a 128-entry register file. This allows for deeply pipelined high-frequency implementations without requiring register renaming to avoid register starvation. Renaming hardware typically consumes a significant fraction of the area and power in a processing system. Consequently, advantageous operation may be achieved when latencies are covered by software loop unrolling or other interleaving techniques.

Preferably, the SPU core 510A is of a superscalar architecture, such that more than one instruction is issued per clock cycle. The SPU core 510A preferably operates as a superscalar to a degree corresponding to the number of simultaneous instruction dispatches from the instruction buffer, such as between 2 and 3 (meaning that two or three instructions are issued each clock cycle). Depending upon the required processing power, a greater or lesser number of floating point execution stages 556 and fixed point execution stages 558 may be employed. In a preferred embodiment, the floating point execution stages 556 operate at a speed of 32 billion floating point operations per second (32 GFLOPS), and the fixed point execution stages 558 operate at a speed of 32 billion operations per second (32 GOPS).

The MFC 510B preferably includes a bus interface unit (BIU) 564, a memory management unit (MMU) 562, and a direct memory access controller (DMAC) 560. With the exception of the DMAC 560, the MFC 510B preferably runs at half frequency (half speed) as compared with the SPU core 510A and the bus 512 to meet low power dissipation design objectives. The MFC 510B is operable to handle data and instructions coming into the SPU 508 from the bus 512, provides address translation for the DMAC, and snoop-operations for data coherency. The BIU 564 provides an interface between the bus 512 and the MMU 562 and DMAC 560. Thus, the SPU 508 (including the SPU core 510A and the MFC 510B) and the DMAC 560 are connected physically and/or logically to the bus 512.

The MMU 562 is preferably operable to translate effective addresses (taken from DMA commands) into real addresses for memory access. For example, the MMU 562 may translate the higher order bits of the effective address into real address bits. The lower-order address bits, however, are preferably untranslatable and are considered both logical and physical for use to form the real address and request access to memory. In one or more embodiments, the MMU 562 may be implemented based on a 64-bit memory management model, and may provide 264 bytes of effective address space with 4K-, 64K-, 1M-, and 16M- byte page sizes and 256 MB segment sizes. Preferably, the MMU 562 is operable to support up to 265 bytes of virtual memory, and 242 bytes (4 TeraBytes) of physical memory for DMA commands. The hardware of the MMU 562 may include an 8-entry, fully associative SLB, a 256-entry, 4way set associative TLB, and a 4×4 Replacement Management Table (RMT) for the TLB—used for hardware TLB miss handling.

The DMAC 560 is preferably operable to manage DMA commands from the SPU core 510A and one or more other devices such as the PU 504 and/or the other SPUs. There may be three categories of DMA commands: Put commands, which operate to move data from the local memory 550 to the shared memory 514; Get commands, which operate to move data into the local memory 550 from the shared memory 514; and Storage Control commands, which include SLI commands and synchronization commands. The synchronization commands may include atomic commands, send signal commands, and dedicated barrier commands. In response to DMA commands, the MMU 562 translates the effective address into a real address and the real address is forwarded to the BIU 564.

The SPU core 510A preferably uses a channel interface and data interface to communicate (send DMA commands, status, etc.) with an interface within the DMAC 560. The SPU core 510A dispatches DMA commands through the channel interface to a DMA queue in the DMAC 560. Once a DMA command is in the DMA queue, it is handled by issue and completion logic within the DMAC 560. When all bus transactions for a DMA command are finished, a completion signal is sent back to the SPU core 510A over the channel interface.

Figure 17:
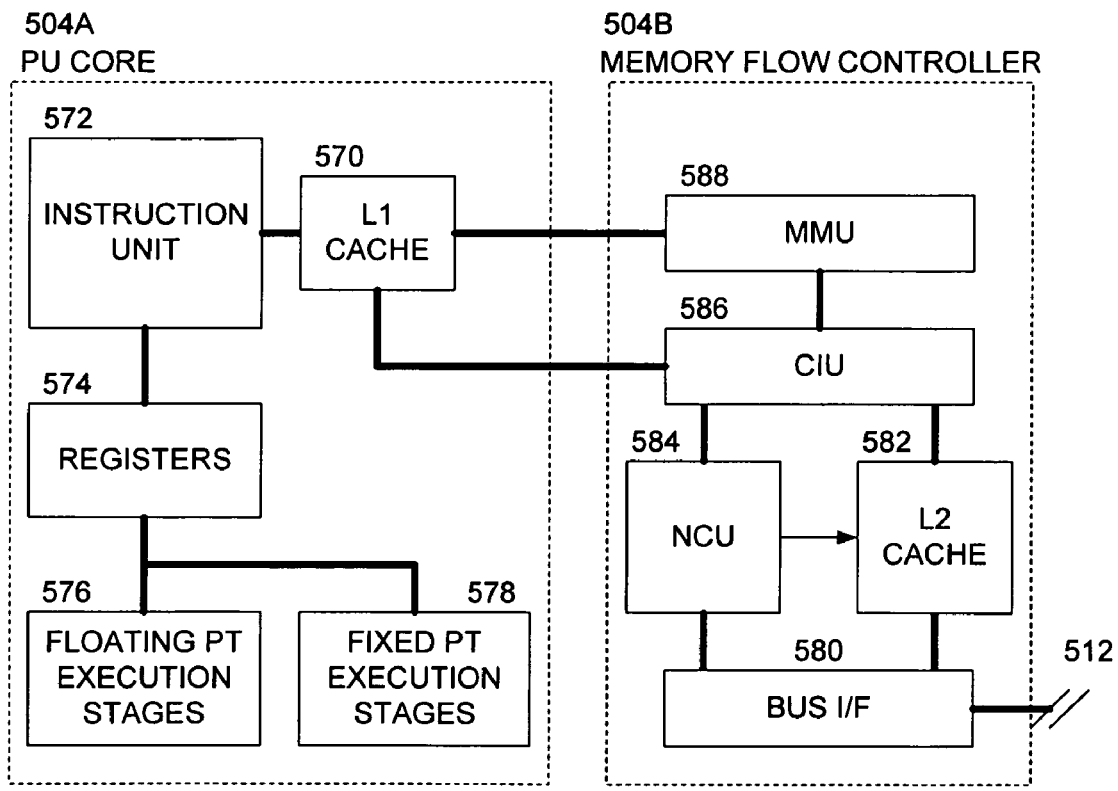
FIG. 17 is a diagram illustrating the structure of an exemplary processing unit (PU) of the system of FIG. 15 that may be adapted in accordance with one or more further aspects of the present invention.

FIG. 17 illustrates the preferred structure and function of the PU 504. The PU 504 includes two basic functional units, the PU core 504A and the memory flow controller (MFC) 504B. The PU core 504A performs program execution, data manipulation, multi-processor management functions, etc., while the MFC 504B performs functions related to data transfers between the PU core 504A and the memory space of the system 100.

The PU core 504A may include an L1 cache 570, an instruction unit 572, registers 574, one or more floating point execution stages 576 and one or more fixed point execution stages 578. The L1 cache provides data caching functionality for data received from the shared memory 106, the processors 102, or other portions of the memory space through the MFC 504B. As the PU core 504A is preferably implemented as a superpipeline, the instruction unit 572 is preferably implemented as an instruction pipeline with many stages, including fetching, decoding, dependency checking, issuing, etc. The PU core 504A is also preferably of a superscalar configuration, whereby more than one instruction is issued from the instruction unit 572 per clock cycle. To achieve a high processing power, the floating point execution stages 576 and the fixed point execution stages 578 include a plurality of stages in a pipeline configuration. Depending upon the required processing power, a greater or lesser number of floating point execution stages 576 and fixed point execution stages 578 may be employed.

The MFC 504B includes a bus interface unit (BIU) 580, an L2 cache memory, a non-cachable unit (NCU) 584, a core interface unit (CIU) 586, and a memory management unit (MMU) 588. Most of the MFC 504B runs at half frequency (half speed) as compared with the PU core 504A and the bus 108 to meet low power dissipation design objectives.

The BIU 580 provides an interface between the bus 108 and the L2 cache 582 and NCU 584 logic blocks. To this end, the BIU 580 may act as a Master as well as a Slave device on the bus 108 in order to perform fully coherent memory operations. As a Master device it may source load/store requests to the bus 108 for service on behalf of the L2 cache 582 and the NCU 584. The BIU 580 may also implement a flow control mechanism for commands which limits the total number of commands that can be sent to the bus 108. The data operations on the bus 108 may be designed to take eight beats and, therefore, the BIU 580 is preferably designed around 128 byte cache-lines and the coherency and synchronization granularity is 128 KB.

The L2 cache memory 582 (and supporting hardware logic) is preferably designed to cache 512 KB of data. For example, the L2 cache 582 may handle cacheable loads/stores, data pre-fetches, instruction fetches, instruction pre-fetches, cache operations, and barrier operations. The L2 cache 582 is preferably an 8-way set associative system. The L2 cache 582 may include six reload queues matching six (6) castout queues (e.g., six RC machines), and eight (64-byte wide) store queues. The L2 cache 582 may operate to provide a backup copy of some or all of the data in the L1 cache 570. Advantageously, this is useful in restoring state(s) when processing nodes are hot-swapped. This configuration also permits the L1 cache 570 to operate more quickly with fewer ports, and permits faster cache-to-cache transfers (because the requests may stop at the L2 cache 582). This configuration also provides a mechanism for passing cache coherency management to the L2 cache memory 582.

The NCU 584 interfaces with the CIU 586, the L2 cache memory 582, and the BIU 580 and generally functions as a queueing/buffering circuit for non-cacheable operations between the PU core 504A and the memory system. The NCU 584 preferably handles all communications with the PU core 504A that are not handled by the L2 cache 582, such as cache-inhibited load/stores, barrier operations, and cache coherency operations. The NCU 584 is preferably run at half speed to meet the aforementioned power dissipation objectives.

The CIU 586 is disposed on the boundary of the MFC 504B and the PU core 504A and acts as a routing, arbitration, and flow control point for requests coming from the execution stages 576, 578, the instruction unit 572, and the MMU unit 588 and going to the L2 cache 582 and the NCU 584. The PU core 504A and the MMU 588 preferably run at full speed, while the L2 cache 582 and the NCU 584 are operable for a 2:1 speed ratio. Thus, a frequency boundary exists in the CIU 586 and one of its functions is to properly handle the frequency crossing as it forwards requests and reloads data between the two frequency domains.

The CIU 586 is comprised of three functional blocks: a load unit, a store unit, and reload unit. In addition, a data pre-fetch function is performed by the CIU 586 and is preferably a functional part of the load unit. The CIU 586 is preferably operable to: (i) accept load and store requests from the PU core 504A and the MMU 588; (ii) convert the requests from full speed clock frequency to half speed (a 2:1 clock frequency conversion); (iii) route cachable requests to the L2 cache 582, and route non-cachable requests to the NCU 584; (iv) arbitrate fairly between the requests to the L2 cache 582 and the NCU 584; (v) provide flow control over the dispatch to the L2 cache 582 and the NCU 584 so that the requests are received in a target window and overflow is avoided; (vi) accept load return data and route it to the execution stages 576, 578, the instruction unit 572, or the MMU 588; (vii) pass snoop requests to the execution stages 576, 578, the instruction unit 572, or the MMU 588; and (viii) convert load return data and snoop traffic from half speed to full speed.

The MMU 588 preferably provides address translation for the PU core 540A, such as by way of a second level address translation facility. A first level of translation is preferably provided in the PU core 504A by separate instruction and data ERAT (effective to real address translation) arrays that may be much smaller and faster than the MMU 588.

In a preferred embodiment, the PU 504 operates at 4-6 GHz, 10F04, with a 64-bit implementation. The registers are preferably 64 bits long (although one or more special purpose registers may be smaller) and effective addresses are 64 bits long. The instruction unit 570, registers 572 and execution stages 574 and 576 are preferably implemented using PowerPC technology to achieve the (RISC) computing technique.

Additional details regarding the modular structure of this computer system may be found in U.S. Pat. No. 6,526,491, the entire disclosure of which is hereby incorporated by reference.

In accordance with at least one further aspect of the present invention, the methods and apparatus described above may be achieved utilizing suitable hardware, such as that illustrated in the figures. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. Furthermore, although the apparatus illustrated in the figures are shown as being partitioned into certain functional blocks, such blocks may be implemented by way of separate circuitry and/or combined into one or more functional units. Still further, the various aspects of the invention may be implemented by way of software and/or firmware program(s) that may be stored on suitable storage medium or media (such as floppy disk(s), memory chip(s), etc.) for transportability and/or distribution.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method, comprising:
    associating entries of a memory allocation table (MAT) managing a shared memory in a multiprocessor system with nodes in a binary tree such that the nodes and the entries are grouped into hierarchical levels;
    associating the nodes and the entries with segments of the shared memory of the multi-processor system such that higher level nodes and entries are associated with larger numbers of contiguous segments of the shared memory and lower level nodes and entries are associated with smaller numbers of contiguous segments of the shared memory;
    selecting one or more of the contiguous segments of the shared memory by one or more processors of the multi-processor system by evaluating status information of entries of the MAT corresponding to a desired size of the shared memory to be reserved followed by evaluating status information of one or more higher level entries; and
    changing status of the one or more contiguous segments by the one or more processors from available to partially reserved to indicate the selection.

2. The method of claim 1, wherein the status information of each entry includes at least an indicator of whether the associated segment or segments of the shared memory have been reserved or are available for reservation.

3. The method of claim 2, wherein the status information of a given entry includes an indicator that the segment or segments of the shared memory associated with one or more lower level entries in a lineage of the given entry have been reserved.

4. The method of claim 2, wherein the status information for each entry is represented by no more than two bits of binary data.

5. The method of claim 1, wherein:
    a highest level node in the tree and an associated highest level entry in the MAT are associated with all of the segments of the shared memory; and
    a plurality of lowest level nodes in the tree and an associated plurality of lowest level entries in the MAT are each associated with one segment of the shared memory.

6. The method of claim 5, wherein the step of selecting one or more segments of the shared memory includes computing a level in the MAT based on a desired size of the shared memory to be reserved.

7. The method of claim 6, wherein the level in the MAT is computed to be approximately equal to $\log_2 (M/D)$, where M is the maximum size of the shared memory available for reservation and D is the desired size of the shared memory to be reserved.

8. The method of claim 6, further comprising selecting one of the entries associated with the computed level having status information indicating that the associated segment or segments of the shared memory are available for reservation.

9. The method of claim 8, further comprising: evaluating one or more higher level entries in a lineage of the selected entry to determine whether the higher level entries have status information indicating that the associated segments of the shared memory are available for reservation.

10. The method of claim 9, repeating the evaluation step for successively higher level entries in the lineage until status information of one of the higher level entries indicates that the associated segments of the shared memory are available for reservation.

11. The method of claim 10, selecting a different one of the entries associated with the computed level if the determination indicates that one or more of the higher level entries in the lineage have status information indicating that the associated segments of the shared memory are not available for reservation, wherein the different one of the entries has status information indicating that the associated segment or segments of the shared memory are available for reservation.

12. The method of claim 1, wherein the reserved segments of the shared memory form one or more reserved objects.

13. The method of claim 12, further comprising sharing the reserved objects among a plurality of processors of the multi-processor system.

14. The method of claim 13, further comprising associating the reserved objects with the associated nodes of the tree within a key table.

15. The method of claim 14, further comprising accessing the key table prior to the step of reserving the one or more segments of the shared memory to determine whether an object has already been formed.

16. The method of claim 15, further comprising:
    using an object that has already been formed when the key table so indicates; and
    selecting one or more segments of the shared memory to form the object when the key table indicates that such object has not been formed.

17. An apparatus comprising:
    a plurality of parallel processors capable of operative communication with a shared memory, each processor including a local memory that is not a hardware cache memory, and an instruction execution pipeline,
    wherein at least one of the processors is operable to:
    read a memory allocation table (MAT) managing the shared memory from a storage medium, the MAT including a plurality of entries, each entry being associated with a respective node in a binary tree such that the nodes and the entries are grouped into hierarchical levels, and the respective nodes and the entries being associated with contiguous segments of a shared memory of a multi-processor system;

select one or more of the contiguous segments of the shared memory by evaluating status information of the entries of the MAT corresponding to a desired size of the shared memory to be reserved;

modify the MAT to indicate that the one or more selected segments of the shared memory have been reserved; and write the modified MAT back to the storage medium.

18. The apparatus of claim 17, wherein the storage medium is the shared memory.

19. The apparatus of claim 17, wherein each processor is operable to transfer blocks of data between the shared memory and its local memory for execution of one or more programs within the local memory.

20. The apparatus of claim 17, wherein each processor is capable of executing the one or more programs within its local memory, but each processor is not capable of executing the one or more programs within the shared memory.

21. The apparatus of claim 17, wherein the processors and associated local memories are disposed on a common semiconductor substrate.

22. The apparatus of claim 17, further comprising the shared memory coupled to the processors over a bus.

23. The apparatus of claim 22, wherein the processors, associated local memories, and the shared memory are disposed on a common semiconductor substrate.

24. A storage medium containing at least one software program capable of causing a multi-processor system to perform actions, comprising:

associating entries of a memory allocation table (MAT) managing a shared memory of the multi-processor system with nodes in a binary tree such that the nodes and the entries are grouped into hierarchical levels, each entry including status information;

associating the nodes and the entries with segments of the shared memory of the multi- processor system such that higher level nodes and entries are associated with larger numbers of contiguous segments of the shared memory and lower level nodes and entries are associated with smaller numbers of contiguous segments of the shared memory;

initializing the MAT such that the status information of at least a plurality of entries indicates that the associated segment or segments of the shared memory are available for reservation; and selecting by one or more processors of the multi-processor system at least one entry in a group of entries in the MAT at a level corresponding to a desired size of the shared memory to be reserved; and changing status of the one or more contiguous segments by the one or more processors from available to partially reserved to indicate the selection.

25. The storage medium of claim 24, selecting the entry by evaluating status information of each entry of the group followed by evaluating status information of one or more higher level entries in a lineage of the selected entry.

* * * * *